UNITED STATES PATENT OFFICE.

WERNER V. BOLTON, OF CHARLOTTENBURG, GERMANY, ASSIGNOR TO SIEMENS & HALSKE AKTIENGESELLSCHAFT, OF BERLIN, GERMANY.

PROCESS FOR PURIFYING TANTALUM METAL.

No. 799,441.

Specification of Letters Patent.

Patented Sept. 12, 1905.

Application filed October 12, 1904. Serial No. 228,207.

*To all whom it may concern:*

Be it known that I, WERNER V. BOLTON, chemist, a subject of the Emperor of Russia, residing at Am Lützow 10, Charlottenburg, near Berlin, Germany, have invented a certain new and useful Improvement in Processes of Purifying Tantalum Metal, of which the following is a full, clear, concise, and exact description.

The object of my present invention is a process for purifying tantalum metal.

Tantalum metal obtained in the known manner—for example, by reduction with sodium—usually contains non-metallic impurities, such as oxids. I have discovered that tantalum metal may be entirely freed from impurities, especially from tantalum oxid, by heating in a suitable electric furnace the mixtures which contain the oxids. The action is probably due to the fact that the oxid is sooner volatilized than the tantalum metal itself. The process is possibly aided by an electrolytic or thermic decomposition of the oxid into metal and oxygen.

I prefer to carry out this process in a vacuum, as the tantalum metal at high temperature is liable to enter into reaction with nearly all known elements. It is obvious that a suitable inert atmosphere could be used in which to effect the purification if a suitable inert gas should be found. The electric arc should not be between carbon electrodes because of the liability of the formation of carbid of tantalum. On the other hand, metallic electrodes may be favorably employed, especially if made of tantalum metal.

The arrangement I prefer consists in pressing rods or bodies of another suitable form from the impure metal powder, or the impure metal may be pounded in a crucible of refractory material. Such crucible may consist of magnesia or thorium oxid, lined at its inner side with a conductive coating—for example, of tantalum metal. The body is made, of the impure metal. The contents of the crucible is connected to one lead, preferably the anode of a source of continuous current. A rod of tantalum metal of sufficient size to prevent its being melted in the electric arc serves as the cathode.

If the cathode is large enough, it may be made of another metal—for example, silver—without entailing the risk of being melted. The described arrangement is inclosed in a casing connected to an air-pump and which casing consists either entirely of glass or else is provided with a spy-hole of glass. The cathode is so mounted that it may be moved in the receptacle after the vacuum has been established without destroying vacuum. The process with this apparatus is accomplished in the following way: After sufficient evacuation of the receptacle by means of the air-pump the movable electrode (cathode) is brought near the tantalum mass to be treated in order to start the electric arc. The arc once formed the cathode is so moved over the surface of the mass to be purified that all parts of the mass are heated successively until the tantalum metal is melted and the oxygen or oxid expelled. In this manner pure homogeneous metallic bodies free from blisters and of large size are obtained, which can easily be subjected to further treatment.

Having thus described my invention, the following is what I claim as new therein and desire to secure by Letters Patent:

1. The herein-described process of purifying tantalum, which consists in fusing the impure metal in an inert environment whereby the impurities are driven off and the metal left free.

2. The herein-described process of purifying tantalum, which consists in fusing the impure metal in an inert environment by an electric current whereby the impurities are driven off and the metal left free.

3. The herein-described process of purifying tantalum, which consists in fusing the impure metal by passing an electric current through the metal in an inert environment whereby the impurities are driven off and the metal left free.

4. The herein-described process of purifying tantalum, which consists in fusing the impure metal in an electric furnace in a vacuum until the impurities are volatilized and drawing off the constituents which have been volatilized by such fusing.

5. The herein-described process of purifying tantalum, which consists in fusing the impure metal containing oxids in an inert environment whereby the impurities are driven off and the metal freed of oxids.

6. The herein-described process of purifying tantalum, which consists in fusing the impure metal containing oxids in an inert environment by an electric current whereby the impurities are driven off and the metal freed of oxids.

7. The herein-described process of obtaining pure tantalum, which consists in heating the impure metal by an electric arc in an inert environment whereby the impurities are driven off and the metal left free.

8. The herein-described process of obtaining pure tantalum, which consists in driving off the impurities from the metal by heat from an electric arc in a vacuum.

9. The herein-described process of obtaining pure tantalum, which consists in heating the impure mixture in a vacuum by means of an electric arc from electrodes of material which does not form compounds with tantalum.

In witness whereof I have hereunto subscribed my name this 30th day of September, A. D. 1904.

WERNER V. BOLTON.

Witnesses:
HENRY HASPER,
WOLDEMAR HAUPT.